United States Patent [19]

Inaba et al.

[11] Patent Number: 4,479,754
[45] Date of Patent: Oct. 30, 1984

[54] INDUSTRIAL ROBOT

[75] Inventors: Hajimu Inaba, Hino; Shigemi Inagaki, Kokubunji, both of Japan

[73] Assignee: Fujitsu Fanuc Limited, Tokyo, Japan

[21] Appl. No.: 394,773

[22] Filed: Jul. 2, 1982

[30] Foreign Application Priority Data

Jul. 4, 1981 [JP] Japan ............................ 56-104775

[51] Int. Cl.³ .......................................... B23Q 7/04
[52] U.S. Cl. .................................. 414/728; 414/736; 414/750; 901/31
[58] Field of Search ............... 414/736, 729, 728, 732, 414/730, 749, 750, 751, 753; 901/31

[56] References Cited

U.S. PATENT DOCUMENTS

| | | | |
|---|---|---|---|
| 2,811,267 | 10/1957 | Bock | 414/736 |
| 3,028,020 | 4/1962 | Peras | 414/736 |
| 3,066,786 | 12/1962 | Allgeyer | 414/736 X |

FOREIGN PATENT DOCUMENTS 2444124 4/1976 Fed. Rep. of Germany .

Primary Examiner—Robert J. Spar
Assistant Examiner—Terrance L. Siemens
Attorney, Agent, or Firm—Staas & Halsey

[57] ABSTRACT

An industrial robot, mountable on a machine tool for carrying a workpiece to a spindle of the machine tool, and having an arm, one end of which is equipped with a wrist having a gripping device for gripping a workpiece. The robot further includes a main body having first and second rods with perpendicular spanning plates movably mounted on the machine tool rotatably connected to the second rod, first driving means provided on the main body for moving the arm axially of the spindle on the machine tool, and second driving means for allowing movement axially of the spindle for rotating the arm in a plane perpendicular to the axis of the spindle, with the other end of the arm serving as the center of rotation about the first rod.

4 Claims, 12 Drawing Figures

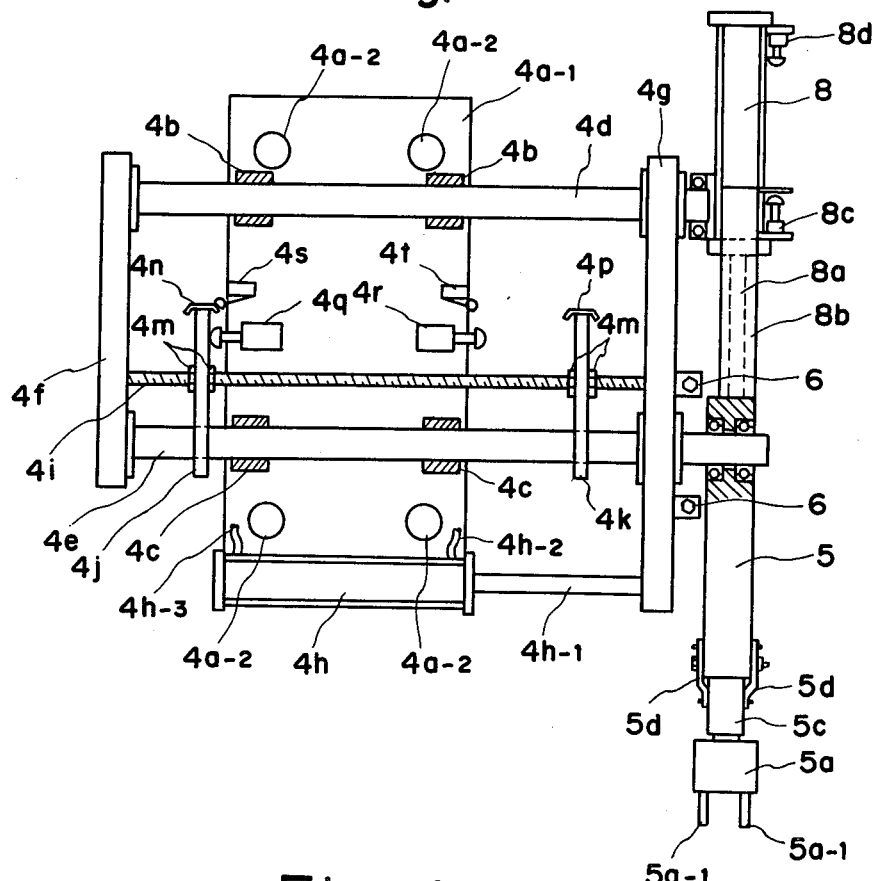
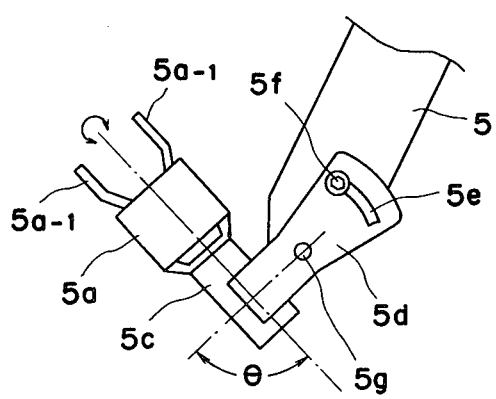

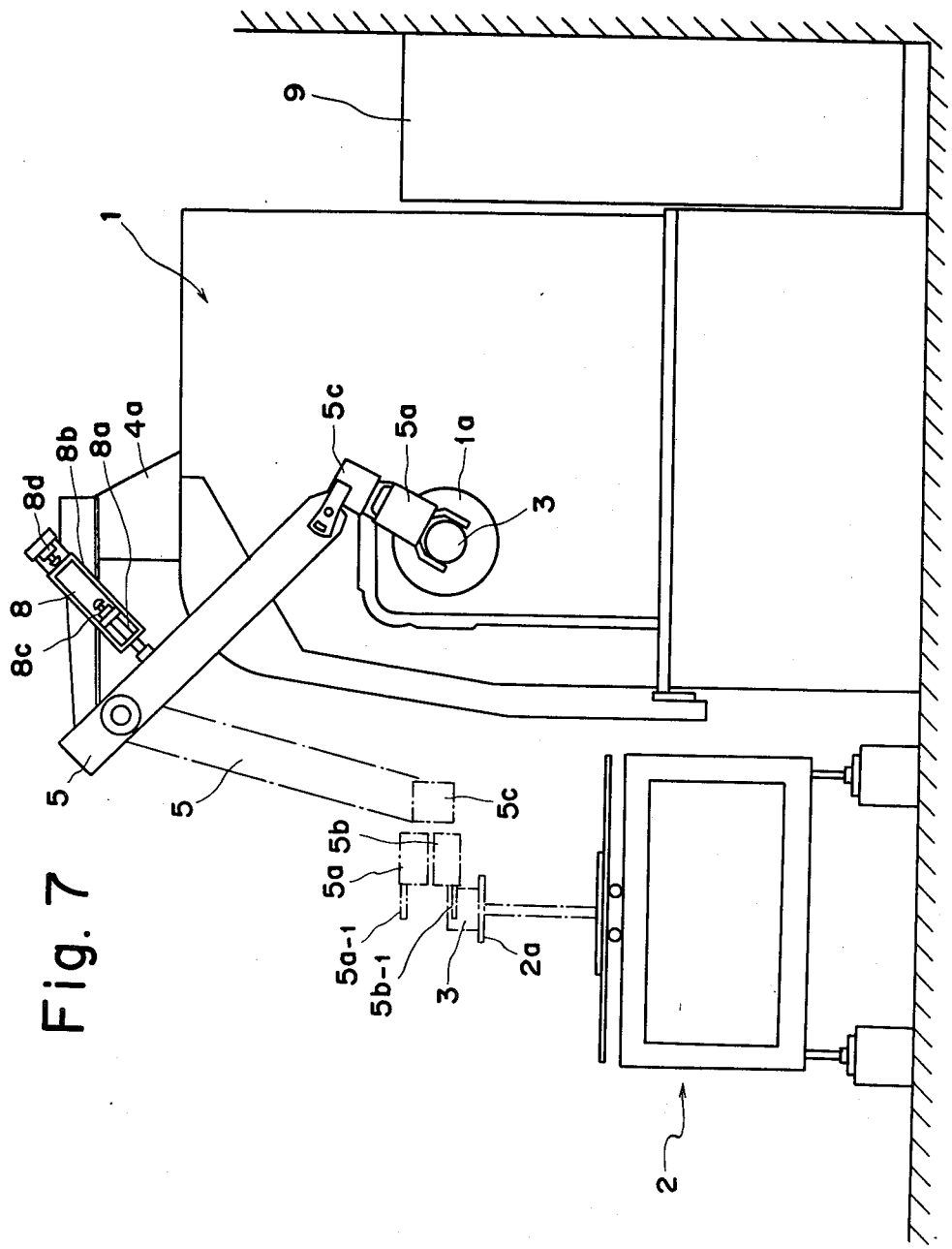

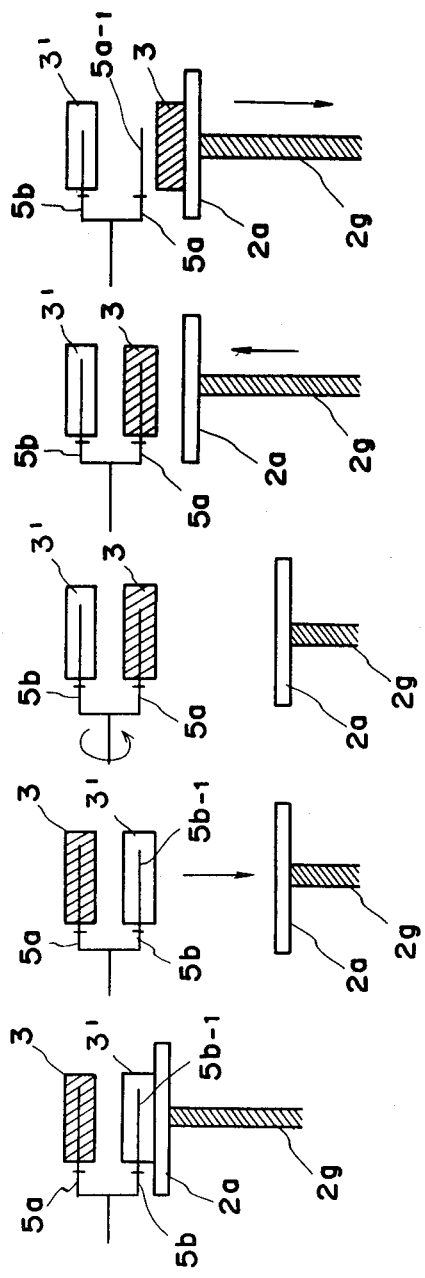

INDUSTRIAL ROBOT

BACKGROUND OF THE INVENTION

This invention relates to an industrial robot capable of being readily installed on a machine tool.

Industrial robots have a gripping device mounted at the end of a hand which extends from the robot body. The body also accommodates control and drive devices. The gripping device is adapted to grasp a workpiece placed on a pallet and to carry the workpiece over a predetermined path to another location for example, to the chuck or a machine tool.

Since an industrial robot of the above kind is comparatively large in size, it is customary to install a single robot in the vicinity of several machine tools and have the robot service each tool. With the wider availability of industrial robots, even small-scale factories now make use of them. Since such smaller factories and plants have limited floor space, the number and kind of machine tools used are few. Thus, rather than having a single large industrial robot service a number of machine tools, a preferable arrangement is to have each machine tool serviced by a smaller robot of its own. There are also instances, even in larger factories, where higher efficiency is achieved by providing each machine tool with a less costly robot of its own. Nevertheless, the industrial robots so far developed are high in price, large in size and take up too much space, and therefore have not succeeded is meeting the above-mentioned requirements.

BRIEF SUMMARY OF THE INVENTION

Accordingly, an object of the present invention is to provide an industrial robot so constructed as not to require additional floor space for installation.

Another object of the present invention is to provide an industrial robot so constructed as to be mountable on a machine tool.

Still another object of the present invention is to provide an industrial robot that is simple in construction and small in size.

A further object of the present invention is to provide an industrial robot that can be constructed at low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a top view illustrating the internal construction of the industrial robot of the present invention with the cover removed;

FIG. 4 is a side elevation illustrating an angle adjustment device attached to the end of the robot hand shown in FIG. 3;

FIG. 7 is a side elevation illustrating the robot of the present invention mounted on a machine tool; and FIGS. 8a through 8e are illustrative views useful in describing the changing of a workpiece in accordance with the present invention.

DESCRIPTION OF THE PREFERRED EMBODIMENTS

Figure 1:
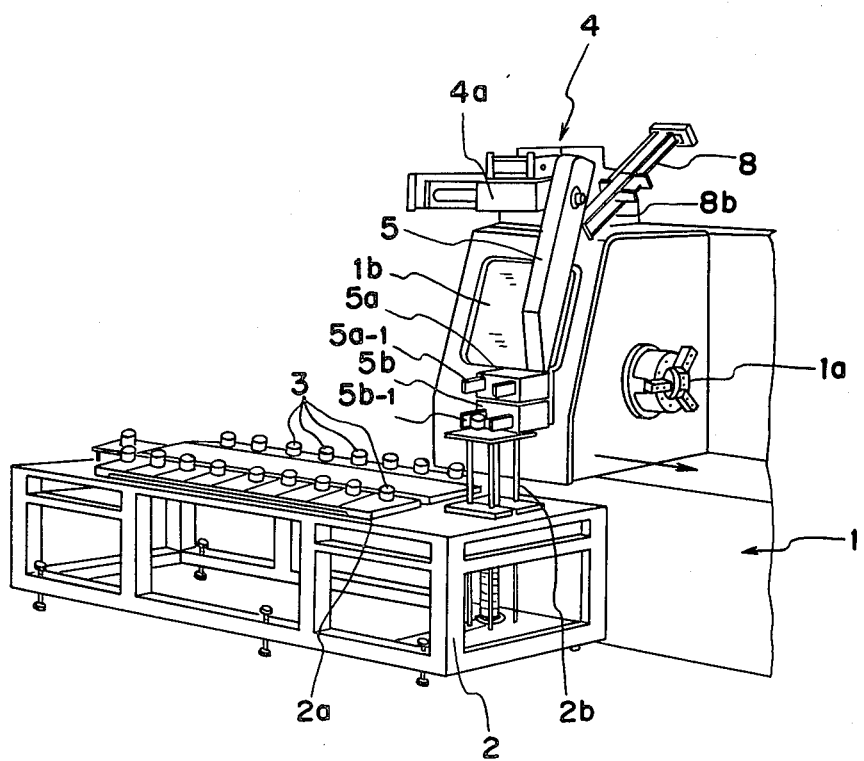
FIG. 1 is a perspective view showing an industrial robot according to the present invention installed on a machine tool.

Referring to FIG. 1, a machine tool 1 has a chuck 1a coupled to a spindle for grasping a workpiece carried to the chuck by an industrial robot, as will be described below, and a door 1b which is shown to be open in the drawing, but which is moved in the direction of the arrow to cover the moving parts of the machine tool when a workpiece cutting operation is in progress. Numeral 2 denotes a workpiece table constructed of a steel framework and having a plurality of movable workpiece feeder pallets 2a disposed thereon, each pallet carrying a workpiece 3.

More specifically, the arrangement is such that the workpiece feeder pallets 2a, 2a . . . are moved or circulated substantially eliptically on the surface of the table 2 by a driving apparatus, not shown. When a pallet 2a is brought into position below the gripping device of the robot, the pallet is lifted by a lifting member 2b so that the workpiece may be gripped. The lifting member 2b is best shown in FIG. 2.

Figure 2:
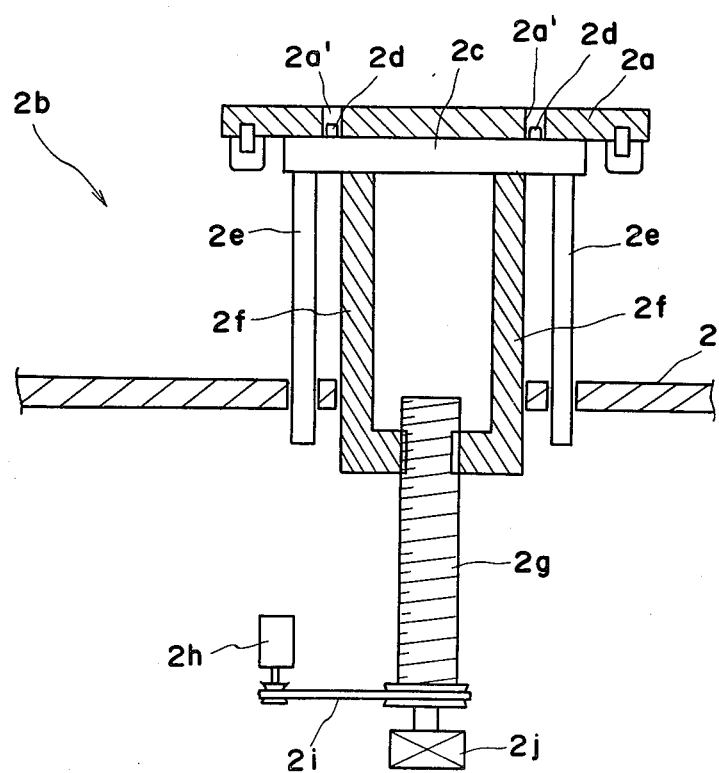
FIG. 2 is a front elevation illustrating the construction of a lifting member provided on the workpiece table shown in FIG. 1.

In FIG. 2, the lifting member 2b includes a base 2c for pushing the pallet 2a upwardly from the table 2. The base 2c has pins 2d on its upper surface for mating with positioning holes 2a' provided in the pallet 2a, and guide rods 2e attached to the lower side thereof at each of its four corners. Each guide rod 2e passes through the upper side of the table 2. A push rod 2f has a threaded lower end which is threadedly engaged with an elevating screw 2g. The latter is coupled to a drive motor 2h via a belt 2i so that rotating the motor causes the screw 2g to turn, thereby raising and lowering the push rod 2f and, hence, the pallet 2a via the base 2c. Reference 2j denotes a brake.

Returning to FIG. 1, the robot of the present invention is indicated generally at numeral 4. The robot 4 includes a main body 4a which is attached to the top of the machine tool 1.

Referring to FIG. 3, which is a top view showing the main parts of the internal construction of the robot following the removal of the cover from the main body 4a, numeral 4a-1 denotes the base plate of the main body 4a. The base plate 4a-1 has four mounting holes 4a-2 for mounting the robot on the machine tool. This is accomplished by passing bolts, projecting from the top of the machine tool 1, through the holes 4a-2, and then by tightening nuts onto the bolts to fix the robot in place. The base plate 4a-1 is provided with bearings 4c, 4c that support a first rod 4e for longitudinal sliding movement, and with bearings 4b, 4b that support a second rod 4d for longitudinal sliding movement. A spanning plate 4f is affixed to the first and second rods 4e, 4d at one of the respective ends thereof, and another spanning plate 4g at the other ends thereof. The rods 4e, 4d pass through the spanning plate 4g and are fixedly secured thereto. The rigid assembly comprising the first and second rods 4d, 4e and the spanning plates 4f, 4g is capable of being moved, relative to the base plate 4a-1, in a direction parallel to the rods 4e, 4d.

Numeral 4h denotes an air cylinder for moving the above-mentioned assembly. The air cylinder 4h is secured to the base plate 4a-1 and accommodates a movable piston, not shown. A piston rod 4h-1 is secured at one end to the piston, and at the other end to the spanning plate 4g. When air is introduced into the cylinder 4h from an air-introducing pipe 4h-2, the piston rod 4h-1 is driven to the left in FIG. 3; when air is introduced from an air-introducing pipe 4h-3, the piston rod 4h-1 is driven to the right in FIG. 3.

A positioning screw rod 4i is secured to the spanning plates 4f, 4g at the respective ends thereof. A pair of positioning plates 4j, 4k are penetrated by the positioning screw rod 4i and first rod 4e and are movable longitudinally of the screw rod 4i. The positioning plates 4j, 4k are secured to the screw rod 4i at desired positions by means of nuts 4m. Dog plates 4n, 4p are attached to the free ends of the positioning plates 4i, 4k, respectively. Buffer stoppers 4q, 4r are attached to the base plate 4a-1 and are adapted to abut against the respective positioning plates 4j, 4k to limit the travelling range of the robot arm, to be described later. Limit switches 4s, 4t are provided for sensing the arrival of the positioning plates 4j, 4k.

The robot arm 5 is rotatably mounted on the end of the first rod 4e projecting from the spanning plate 4g. A pair of grippers 5a, 5b (see FIGS. 1 and 7) are provided at the free end of the arm 5, and include fingers 5a-1, 5b-1, respectively. As shown in FIG. 1, the fingers 5b-1 of gripper 5b are gripping a workpiece 3. The grippers 5a, 5b are rotatable at the end of arm 5 so that gripper 5a can be positioned over gripper 5b, and vice versa. Furthermore, it is possible to adjust the bending angle defined by the rotational axis of the robot wrist and the longitudinal axis of the arm 5, namely the angle formed between longitudinal axis of the arm and the gripping faces of the grippers 5a, 5b. This will be described in further detail with reference to FIG. 4.

FIG. 4 is a side elevation illustrating means for adjusting the angle of the robot wrist. Numeral 5c denotes a wrist which is affixed to a mounting bracket 5d pivoted about a shaft 5g at the end of the arm 5. As shown, the mounting bracket 5d is provided with an arcuate guide slot 5e which allows the angle $\theta$ defined by the longitudinal axis of the arm 5 and the rotational axis of the wrist 5c to be adjusted to an angle of a predetermined magnitude by rotating the mounting bracket 5d relative to the arm 5 about the shaft 5g. Specifically, loosening nut 5f enables the angle $\theta$ to be set, and retightening the nut 5f fixes the mounting bracket 5d to the arm 5 to fix the angle at the set value.

Figure 5:
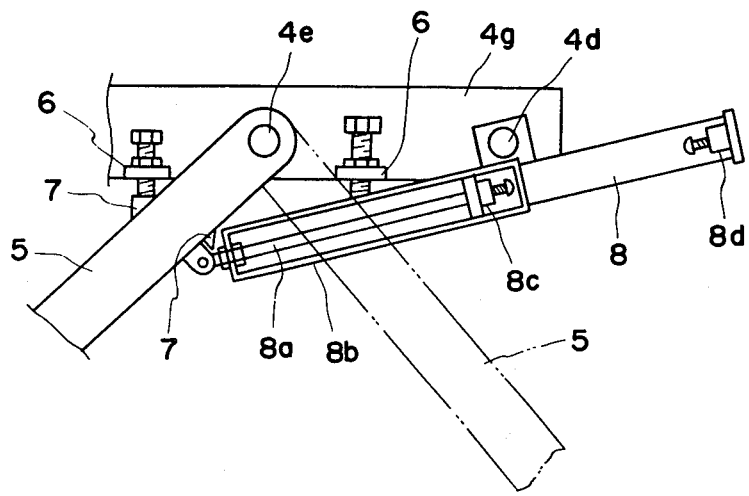
FIG. 5 is a side elevation illustrating the driving mechanism of the hand shown in FIG. 3.

FIG. 5 shows the arrangement of FIG. 3 from the side. As shown, the spanning plate 4g is provided with a pair of stoppers 6 for limiting the angle through which the arm 5 can rotate, and which allow this angle to be changed when necessary. The arm 5 is provided with a pair of stoppers 7 at positions where they will abut the stoppers 6 of the spanning plate 4g. An air cylinder 8 for swinging or rotating the arm 5 has one end pivotally secured to the second rod 4d. Provided within the air cylinder 8 is a movable piston. A piston rod 8a has one end fixedly secured to the piston, and has its other end pivoted on a portion of the arm 5. Though not illustrated, pipes for introducing air into the air cylinder 8 are provided at the right and left ends thereof. When air is introduced from the pipe at the right end of the cylinder, the piston rod 8a is extended and swings the arm 5 to the position shown by the solid lines in FIG. 5. When air is introduced from the pipe at the left end of the cylinder, the piston rod 8a is retracted and swings the arm 5 to the position shown by the phantom lines in FIG. 5. Attached to the end of the piston rod 8a for movement together therewith is a frame 8b. Buffer stoppers 8c, 8d are affixed to the respective ends of the air cylinder 8 so that the frame 8b will abut against them whenever the piston rod 8a makes a full stroke within the air cylinder.

Figure 6:
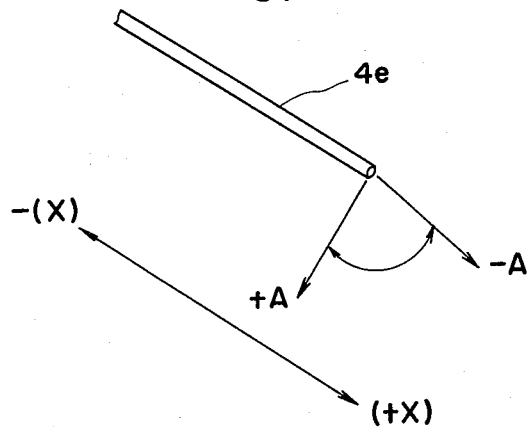
FIG. 6 is an illustrative view showing directions of hand movement.

Reference will now be had to FIGS. 6, 7 and 8 to describe how a workpiece 3 is moved between the table 2 and machine tool 1 using the robot of the present invention. We shall take the longitudinal direction of the machine tool spindle, namely the axial direction of the first rod 4e, as the X-direction, and the direction in which the arm 5 swings about the rod 4e as the A-direction. Also, before the robot can begin performing services, various adjustments and settings must be made. The first of these is to swing the arm 5 in the −A-direction, that is, counter-clockwise as shown in FIG. 7, followed by adjusting the angle of the wrist 5c relative to the arm in such a manner that the gripping center of the grippers 5a, 5b, held in front of the chuck 1a, coincides with the chuck center. This is the condition shown by the solid lines in FIG. 7. Following this adjustment, the nut 5f (FIG. 4) is tightened to fix the angle of the wrist 5c relative to the arm 5. Concurrently, one of the stoppers 6 is adjusted to limit the swinging motion of the arm 5 in the −A (counter-clockwise) direction. In addition, the positioning plate 4k is adjusted to set the limit of travel of the arm 5 in the −X-direction. Next, the arm 5 is moved in the +X-direction by actuating the air cylinder 4h and is swung in the +A (clockwise) direction by actuating the air cylinder 8, so that the gripping faces of the grippers lie parallel with the surface of the workpiece feeder pallet. This condition is indicated by the phantom lines in FIG. 7. Thereafter, the remaining stopper 6 is adjusted to limit the swinging motion of the arm 5 in the +A-direction, and the positioning plate 4j is adjusted to limit the travel of the arm 5 in the +X-direction.

The above completes the limit and other settings so that the robot is ready to service the machine tool in a manner which will now be described.

[A] To illustrate the operation of the invention, we will first describe an example of a sequence wherein single workpieces are placed upon each pallet, and in which the workpieces are loaded and unloaded, relative to the chuck 1a.

(1) Door 1b, shown in FIG. 1, is opened in response to a signal generated by a control device 9 (FIG. 7) provided in back of the machine tool 1.

(2) Arm 5 is swung in the −A-direction in response to a signal that actuates the air cylinder 8.

(3) Arm 5 is moved in the −X direction in response to a signal that actuates the air cylinder 4h, after which the fingers 5a-1 of the gripper 5a opposing the chuck 1a are closed to grip a machined workpiece 3 being held by the chuck 1a.

(4) The chuck 1a is opened to release the workpiece 3.

(5) Arm 5 is moved a short distance in the +X-direction in response to a signal that actuates the air cylinder 4h.

(6) The grippers 5a, 5b are rotated 180 degrees relative to the wrist 5c to bring the gripper 5b into position opposing the chuck 1a, after which arm 5 is moved in the −X direction in response to a signal that drives the air cylinder 4h. This causes the unmachined workpiece 3', held by gripper 5b, to be carried to the chuck 1a.

(7) Chuck 1a is closed to grasp the unmachined workpiece 3', after which the fingers 5b-1 are opened to release the unmachined workpiece 3'.

(8) Arm 5 is moved in the +X-direction in response to a signal that actuates the air cylinder 4h, after which the arm is swung in the +A-direction in response to a signal that actuates the air cylinder 8.

(9) The door 1b of the machine tool 1 is closed.

(10) The grippers 5a, 5b are rotated 90 degrees relative to the wrist 5c to position gripper 5b below gripper 5a. This is the condition shown by the phantom lines in FIG. 7.

(11) A workpiece feeder pallet 2a carrying an unmachined workpiece 3' is raised, as shown in FIG. 8a, to lift the unmachined workpiece 3' up to the gripper 5b.

(12) The fingers 5b-1 are closed to grip the unmachined workpiece 3', whereupon the pallet 2a is lowered part of the way, a shown in FIG. 8b.

(13) Grippers 5a, 5b are rotated 180 degrees relative to the wrist 5c to position gripper 5a below gripper 5b. This is indicated in FIG. 8c.

(14) Pallet 2a is raised, as depicted in FIG. 8d.

(15) Fingers 5a-1 of gripper 5a are opened to place the machined workpiece 3 on pallet 2a, as shown in FIG. 8e.

(16) Pallet 2a is lowered to the table 2 (FIG. 1) and grippers 5a, 5b are rotated 90 degrees relative to the wrist 5c.

(17) The pallets on the workpiece feeder are rotated to bring the next pallet into position, thereby ending one cycle.

In the foregoing example, single workpieces are placed upon each pallet of the workpiece feeder. There are cases, however, where a plurality of workpieces are stacked on each pallet and gripped one after another by the hand. Such a case will now be described to exemplify another mode of robot operation.

[B] Palletizing sequence (1) Door 1b, shown in FIG. 1, is opened in response to a signal generated by a control device 9 (FIG. 7) provided in back of the machine tool 1.

(2) Arm 5 is swung in the −A-direction in response to a signal that actuates the air cylinder 8.

(3) Arm 5 is moved in the −X direction in response to a signal that actuates the air cylinder 4h, after which the fingers 5a-1 of the gripper 5a opposing the chuck 1a are closed to grip a machined workpiece 3 being held by the chuck 1a.

(4) The chuck 1a is opened to release the workpiece 3.

(5) Arm 5 is moved a short distance in the +X-direction in response to a signal that actuates the air cylinder 4h.

(6) The grippers 5a, 5b are rotated 180 degrees relative to the wrist 5c to bring the gripper 5b into position opposing the chuck 1a, after which arm 5 is moved in the −X direction in response to a signal that drives the air cylinder 4h. This causes the unmachined workpiece 3', held by gripper 5b, to be carried to the chuck 1a.

(7) Chuck 1a is closed to grasp the unmachined workpiece 3', after which the fingers 5b-1 are opened to release the workpiece 3'.

(8) Arm 5 is moved in the +X-direction in response to a signal that actuates the air cylinder 4h, after which the arm is swung in the +A-direction in response to a signal that actuates the air cylinder 8.

(9) The door 1b of the machine tool 1 is closed.

(10) The grippers 5a, 5b are rotated 90 degrees relative to the wrist 5c to position gripper 5b below gripper 5a.

(11) A workpiece feeder pallet 2a carrying an unmachined workpiece 3' is raised, as shown in FIG. 8a, to lift the unmachined workpiece 3' up to the gripper 5b.

(12) The fingers 5b-1 are closed to grip the unmachined workpiece 3', whereupon the pallet 2a is lowered.

(13) Grippers 5a, 5b are rotated 180 degrees relative to the wrist 5c to position gripper 5a below gripper 5b.

(14) The pallets on the workpiece feeder are backed up so that a pallet carrying a machined workpiece(s) 3 is brought into position below the grippers.

(15) It is confirmed that the grippers have been rotated 180 degrees.

(16) It is confirmed that door 1b is closed.

(17) The pallet carrying the machined workpiece is raised, after which the fingers 5a-1 of gripper 5a are opened to place the machined workpiece 3 gripped thereby on the pallet.

(18) The grippers 5a, 5b are rotated 90 degrees relative to the wrist 5c, and the pallet is lowered.

(19) The pallets on the workpiece feeder are rotated to bring a pallet carrying unmachined workpieces 3' into position below the grippers.

The foregoing series of operations can be executed by means of a well-known sequence controller built into the control device 9, or by means of a numerical control device.

In accordance with the present invention as described and illustrated hereinabove, the industrial robot is capable of both linear motion, in which a workpiece is fitted into and withdrawn from the chuck of a machine tool, and swinging motion wherein a workpiece is moved from the chuck to the front of the machine tool and then back again. Moreover, insofar as the wrist is concerned, an angle adjusting device is provided to enable variation of the angle defined by the wrist and the hand in such fashion that the gripping faces of the grippers can be made horizontal after the gripping center of the grippers, held in front of the chuck, is aligned with the central axis of the chuck when a workpiece is to be inserted, or after the angle through which the arm swings to the front of the machine tool is set. Such an arrangement enables the robot to be set at a suitable position with respect to the machine tool, and to load and unload workpieces freely. Since the robot is designed for installation of the machine tool proper, no additional floor space is required. The close proximity of the robot and machine tool means that the robot can be reduced in size and that a mechanism for extending and retracting the arm longitudinally can be dispensed with, unlike the prior-art arrangements. This contributes to a simpler and less costly construction. In addition, adopting the double-hand configuration described hereinabove allows machined and unmachined workpieces to be exchanged between the chuck and pallet locations in a simple and efficient manner.

As many different embodiments of the present invention can be made without departing from the spirit and scope thereof, it is to be understood that the invention is not limited to the specific embodiments thereof except as defined in the appended claims.

What we claim is:

1. An industrial robot mounted on a machine tool for servicing said machine tool, comprising:
 a spindle on the machine tool;

an arm having first and second ends and equipped at the first end thereof with a wrist and gripping means for gripping an object;

a main body for being mounted on the machine tool, the main body having a first rod about which said arm rotates;

first driving means provided on said main body for moving said arm and said first rod axially of the spindle on the machine tool;

second driving means for rotating said arm in a plane perpendicular to the axis of the spindle, with the second end of the arm serving as the center of rotation; and a second rod and a pair of spanning plates spanning and interconnecting said first rod and said second rod, said pair of spanning plates being moved by said first driving means.

2. An industrial robot according to claim 1, wherein the first rod serves as the center of rotation of said arm, and said second driving means is rotatably provided on the second rod.

3. An industrial robot according to claim 1, wherein said second rod is mounted on said main body via bearings.

4. An industrial robot mounted on a machine tool for servicing said machine tool, comprising:

a spindle on the machine tool;

an arm having first and second ends and equipped at the first end thereof with a wrist and gripping means for gripping an object;

a main body for being mounted on the machine tool;

first driving means provided on said main body for moving said arm axially of the spindle on the machine tool;

second driving means for rotating said arm in a plane perpendicular to the axis of the spindle, with the second end of the arm serving as the center of rotation; and angle adjusting means provided between said wrist and said arm for changing the angle defined by the longitudinal axis of said arm and the rotational axis of said wrist, wherein the angle adjusting means includes an arcuate guide slot and a nut located in the slot which can be loosened and retightened to enable adjustment of the angle.

* * * * *

UNITED STATES PATENT AND TRADEMARK OFFICE
CERTIFICATE OF CORRECTION

PATENT NO. : 4,479,754
DATED : 10/30/84
INVENTOR(S) : HAJIMU INABA

It is certified that error appears in the above-identified patent and that said Letters Patent is hereby corrected as shown below:

(56) References Cited

After "U.S. Patent Documents" insert --2,792,953 5/1957 King.....214/146.5--.

(56)...FOREIGN PATENT DOCUMENTS

After "2,444,124 4/1976 Fed. Rep. of Germany insert
--2,046,691A 11/80 Great Britain
  2,441,461  6/80  France--.

(57) ABSTRACT
Line 7, delete "rotatably";
Line 8, delete "connected to the second rod" and insert --for allowing movement axially of the spindle--;
Line 11, delete "for allowing movement axially of the spindle"; insert --rotatably connected to the second rod--.

Col. 5
Line 18, "a" s/b --as--.

Signed and Sealed this

Twenty-third Day of April 1985

[SEAL]

Attest:

DONALD J. QUIGG

Attesting Officer    Acting Commissioner of Patents and Trademarks